United States Patent
Ohara et al.

(10) Patent No.: US 6,210,286 B1
(45) Date of Patent: Apr. 3, 2001

(54) RIDING GAME SYSTEM

(75) Inventors: Toshiya Ohara, Yamato; Hideaki Yamamoto, Yokohama; Sumito Oda; Takashi Ohwaki, both of Kawasaki, all of (JP)

(73) Assignee: Namco, Ltd., Tokyo (JP)

( * ) Notice: Subject to any disclaimer, the term of this patent is extended or adjusted under 35 U.S.C. 154(b) by 0 days.

(21) Appl. No.: 09/474,089

(22) Filed: Dec. 29, 1999

Related U.S. Application Data

(62) Division of application No. 09/026,160, filed on Feb. 19, 1998, now Pat. No. 6,059,666.

(30) Foreign Application Priority Data

Feb. 21, 1997 (JP) .................................................. 9-54088
Jul. 16, 1997 (JP) ................................................ 9-207215

(51) Int. Cl.[7] .................................................. A63G 13/08
(52) U.S. Cl. ............................................. 472/97; 472/60
(58) Field of Search .............................. 472/59, 60, 61, 472/95, 96, 97, 99; 434/55, 247, 365; 463/7, 36

(56) References Cited

U.S. PATENT DOCUMENTS

| | | | |
|---|---|---|---|
| 2,726,870 | * 12/1955 | Auger | 472/97 |
| 4,630,817 | 12/1986 | Buckley | 463/36 |
| 4,988,300 | 1/1991 | Yamaguchi et al. | 434/247 |
| 5,080,373 | 1/1992 | Jones | 434/247 X |
| 5,195,746 | 3/1993 | Boyd et al. | 463/36 |
| 5,429,515 | 7/1995 | Greenwood | 434/247 |
| 5,713,794 | 2/1998 | Shimojima et al. | 463/36 |
| 5,848,939 | 12/1998 | Smith | 472/60 |
| 5,951,404 | * 9/1999 | Oishi et al. | 472/60 |

FOREIGN PATENT DOCUMENTS

| | | |
|---|---|---|
| 0 712 650 A2 | 5/1996 | (EP) . |
| 4-92297 | 8/1992 | (JP) . |
| 4-70038 | 11/1992 | (JP) . |
| 5-076658 | 3/1993 | (JP) . |

* cited by examiner

Primary Examiner—Kien T. Nguyen
(74) Attorney, Agent, or Firm—Oliff & Berridge, PLC

(57) ABSTRACT

A riding game system provides a feeling as if a player is riding on a real animal. The riding game system includes a mimetic animal device and a display showing a virtual space. The mimetic animal device is in the form of a horse having a head and a body. The player controls the mimetic animal device like controlling an animal in the virtual space by riding on the body, gripping a rein portion provided on the head and placing the player's foot on a pair of steps provided at the body. The head is inclined up and down and rotated from side to side. The body is rocked back and forth while the steps are also rocked back and forth. The rotational movement of the head from side to side and the rocking movement of the body backward and forward are detected as information for controlling the virtual horse in the virtual space.

9 Claims, 7 Drawing Sheets

RIDING GAME SYSTEM

This is a division of application Ser. No. 09/026,160 filed Feb. 19, 1998. The entire disclosure of the prior application is hereby incorporated by reference herein its entirety.

BACKGROUND OF THE INVENTION

1. Field of the Invention

The present invention relates to a riding game system for enjoying a game by operating a playing ride.

2. Description of the Related Art

Conventionally, there is known a game for operating and moving a virtual animal within a virtual space shown in a display by actually operating a device imitated as any animal. For example, in a game for riding an animal such as a horse riding may include a ride shaped like a horse on which a player rides to operate a virtual horse on a display.

However, it was difficult for the conventional riding game system of the above type to give a feeling to a player riding on the ride as if the player is handling a real animal.

Further, a conventionally known game is one in which a player can move within a virtual space on a display by operating a game device shaped like various rides such as a vehicle, car, motorcycle, bicycle or animal.

As an example of a game system for operating a motorcycle and the like, Japanese Patent Application No. 61-130591 discloses a motorcycle driving game system in which a player operates a motorcycle by shifting his/her own weight on the ride to rock an operating seat.

Such a conventional game system can cause the player to feel a back-and-forth rocking movement as in the actual motorcycle. The system can provide a game correspondingly improved in reality.

However, this prior art system comprises a support post having its bottom end mounted on a base being capable of rocking and a main body formed as an operator seat of an actual vehicle, which is fixedly mounted on the top end of the support post. A player rocks the main body back and forth against a given biasing force. Therefore, the back-and-forth rocking movement of the main body is transmitted directly to the base through the support post and biasing means. Consequently, the base itself will shake backward and forward. In the worst case, a problem may be raised in that the base moves back and force relative to a proper position of the base.

A plurality of such game machines are often installed adjacent to one another within a limited installation space. If each of the game machines moves within the limited space due to its back-and-forth oscillating movement, the adjacent game machines may impact against each other and damage them. A further problem may be raised in that additional work is required to fix the game machines to the floor.

SUMMARY OF THE INVENTION

The first object of the present invention is to provide a riding game system which can provide a feeling resembling the handling of a real animal.

The second object of the present invention is to provide a riding game system which can provide a optimal rocking movement in an given direction and yet which can greatly reduce the transmission of a oscillation to the rocking direction to the base.

The other object of the present invention is to provide a riding game system which can provide a optimal rocking movement when a player rides on and rocks backward and forward a main body having a form of an animal to operate a player character having a shape of the animal in a display and yet in which the transmission of an oscillation of the rocking direction to the base can greatly be reduced.

To accomplish the first object mentioned above, the present invention provides a riding game system including a mimetic animal device having a configuration resembling an animal with a head and a body, the mimetic animal device being operable by a player when the player rides on the body, grips a rein portion provided at the head and puts feet on a pair of steps provided at the body, in a manner as a virtual animal is controlled within a virtual space; and means for displaying the virtual space; and wherein the body is capable of backward and forward rocking movement; and wherein the backward and forward rocking movement of the body is detected to be information being used to control the virtual animal within the virtual space.

The player can obtain such a feeling as controlling a real animal by rocking the body of the mimetic animal device.

The present invention also provides a riding game system including:

a mimetic animal device having a configuration resembling an animal with a head and a body, the mimetic animal device being operable by a player when the player rides on the body, grips a rein portion provided at the head and puts feet on a pair of steps provided at the body, in a manner as a virtual animal is controlled within a virtual space; and means for displaying the virtual space; and wherein the head is capable of upward and downward inclining movement, and rotational movement from side to side;

wherein the body is capable of backward and forward rocking movement;

wherein the steps are capable of backward and forward rocking movement; and wherein the rotational movement of the head and the rocking movement of the body are detected to be information being used to control the virtual animal within the virtual space.

The player can obtain such a feeling as control a real animal by moving the head, body and steps of the mimetic animal device.

With the riding game system, it is preferred that the rotational movement of the head and the rocking movement of the body are detected, the rotational movement of the head determining the running direction of the virtual animal, the rocking movement of the body determining the running speed of the virtual animal.

Thus, the virtual animal cannot be controlled in the virtual space merely by inclining the head backward and forward or rocking the steps backward and forward. The positive rocking action of the body backward and forward is actually required to control the virtual animal in the virtual space. Therefore, the action of the player more resembles the handling of a real animal.

With the riding game system, it is also preferred that the body rocks backward and forward by moving the rein portion upward and downward, and the steps rock forward and backward depending on the player's posture.

In such an arrangement, the rein portion can be moved to rock the body of the mimetic animal device. Particularly, if the running speed of the virtual animal is determined by rocking the body, the rein portion can be used to adjust the running speed of the virtual animal. This can provide a feeling which resembles the handling of a real animal.

To accomplish the second object of the present invention, the present invention provides a riding game system including:

a slide platform mounted on a base slidably in a first direction;

a main body supported on the slide platform, being capable of rocking movement in the first direction, the main body being rocked by a player;

biasing means for returning the main body to neutral position thereof; and link means disposed between the main body and the base; and wherein the main body is rocked in the first direction while sliding the slide platform in the first direction.

It is preferred that the link means is formed as a link arm.

It is also preferred that the link means connects between the main body and the base. By doing this the link means controls the sliding of the slide platform so that the slide platform moves backward when the main body inclines forward in the first direction, and the slide platform moves forward when the main body inclines backward. In such a connection, the link means may connect between the main body and the base along the first direction.

It is further preferred that the main body is formed as a game ride body which is rocked and controlled by a player riding thereon.

The main body is rocked by the player in the first direction against the biasing force of the biasing means. At this time, the oscillation transmitted from the main body to the base is absorbed by the slide movement of the slide platform in the first direction.

Thus, the player can feel an operational sense by rocking the body in the first direction. In addition, the oscillation created by the rocking movement may be absorbed by the slide movement of the slide platform in the first direction without being transmitted directly to the base. Therefore, the game can be played by rocking the main body without creation of any undesirable motion such as deviation of the base position.

It is further preferred that the link means is mounted in the direction toward a virtual center positioned on a perpendicular including the rocking center of the main body when the main body is in the neutral position.

More particularly, when the main body is in its neutral position, the direction in which the link means is mounted is set toward a desired virtual center which is on the perpendicular including the rocking center of the main body. Thus, the main body will be rocked about the virtual center in the first direction.

It is preferred that the virtual center is positioned so that it is on perpendicular including the rocking center of the main body and has a height substantially equal to the center of gravity of the main body when the main body is in the neutral position.

With the height of the virtual center being substantially equal to the center of gravity of the main body when it is in its neutral position, a component in the rocking movement in the first direction can be extremely small even if the main body is rocked. As a result, the oscillation transmitted to the base in the first direction can greatly be reduced.

It is further preferred that the link means is mounted on the main body being adjustable in the direction of height of the main body. In other words, the direction in which the link means is mounted on the main body is adjustable.

In such an arrangement, the mounting position of the main body can be adjusted to select the minimum transmission of signal to the base even if the center of gravity of the main body is ambiguous. Thus, the virtual center can be set at the same height as the center of gravity of the main body.

It is further preferred that the biasing means is disposed between the slide platform and the main body.

It is further preferred that the biasing means includes first and second biasing members which are disposed between the slide platform and the main body with the rocking center being sandwiched therebetween in the first direction.

It is further preferred that a cushion material is located between the slide platform and the main body, the cushion material may absorb an upward and downward impact transmitted from the main body to the slide platform.

In such an arrangement, the upward and downward oscillation created by the rocking motion of the main body in the first direction can more effectively be absorbed by the cushion material while at the same time the biasing force returning the main body to its neutral position can be improved.

It is further preferred that the first direction is set in the backward and forward direction relative to the player riding on the main body.

In such an arrangement, the player can control the player character by rocking the main body backward and forward.

It is further preferred that the main body is in the form of an animal which is capable of backward and forward rocking movement by a player riding thereon.

It is further preferred that the riding game system comprises:

means for detecting a rocking angle of the main body; and means for controlling a player character in the form of the animal within the virtual space according to the detected rocking angle.

In such an arrangement, the player can control the player character in the form of an animal by riding on the main body like an animal and rocking the main body backward and forward. Particularly, since a character resembling a real animal or the like will be moved by the rocking motion of the main body backward and forward, such a game that the player actually rides on a character like an animal or the like and runs about within the virtual space can be enjoyed by the player with such a feeling that the player actually handles the animal.

In such a manner, the present invention may provide a riding game system in which the player riding on the game ride in the form of an animal can more effectively rock the main body to control the player character in the form of the animal and yet which can greatly reduce the transmission of the oscillation to the base in the rocking direction.

DETAILED DESCRIPTION OF THE PREFERRED EMBODIMENTS

Some preferred embodiments of the present invention will now be described in detail with reference to the drawings.

First Embodiment

Figure 2:
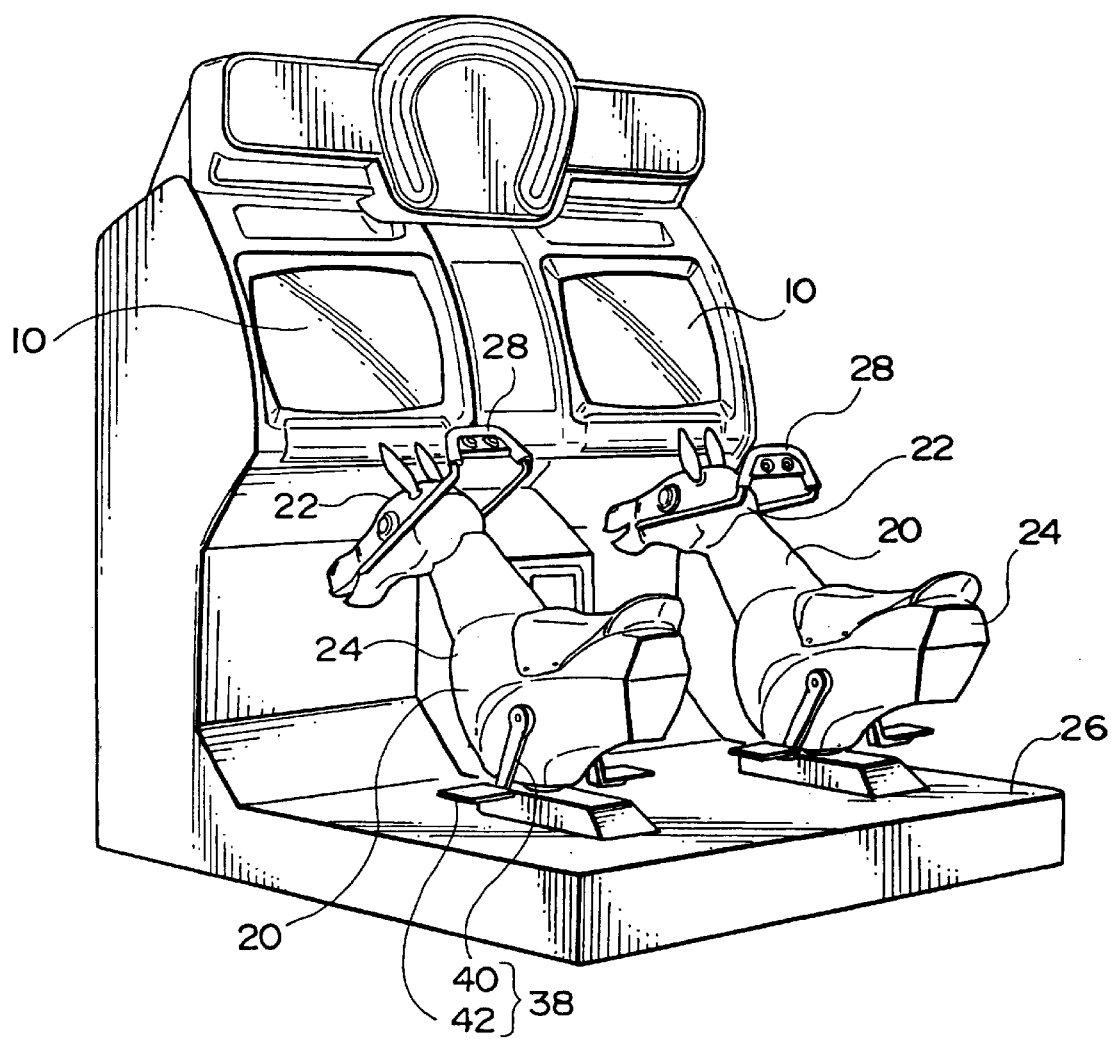
FIG. 2 is a perspective view of the outline of the first embodiment.

FIG. 2 shows the first preferred embodiment of a riding game system constructed in accordance with the present invention.

Figure 4:
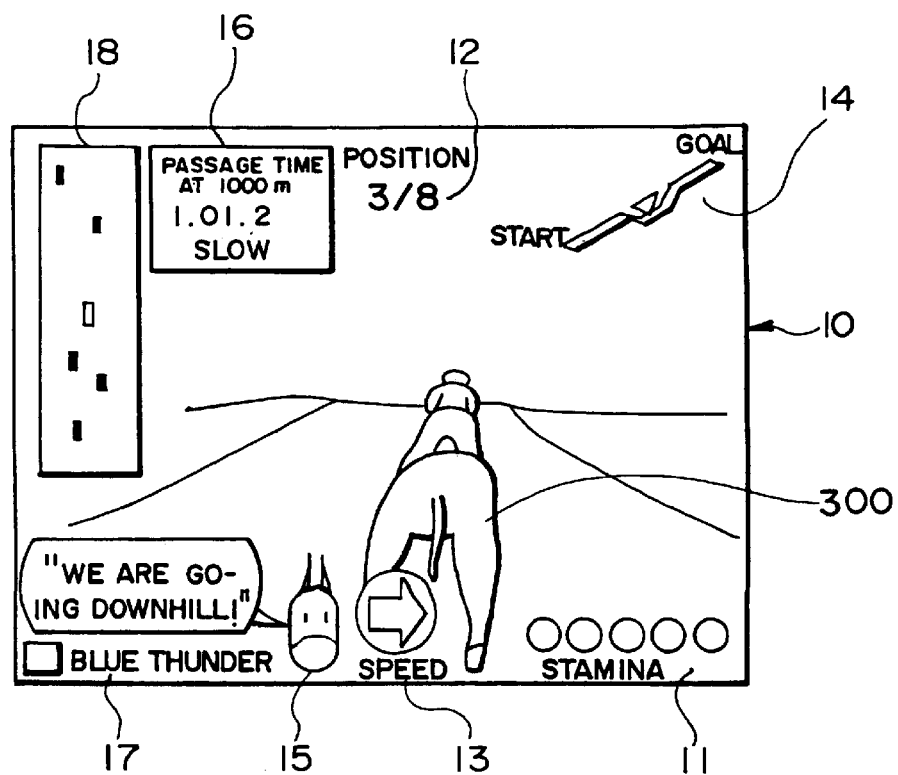
FIG. 4 illustrates an example of display screen.

The riding game system comprises two displays 10 and two mimetic animal devices 20. Each of these displays 10 shows a picture of horse racing in accordance with information from the corresponding one of the two mimetic animal devices 20 (FIG. 4). Correspondingly, the mimetic animal devices 20 are in the form of racing horses.

Figure 1:
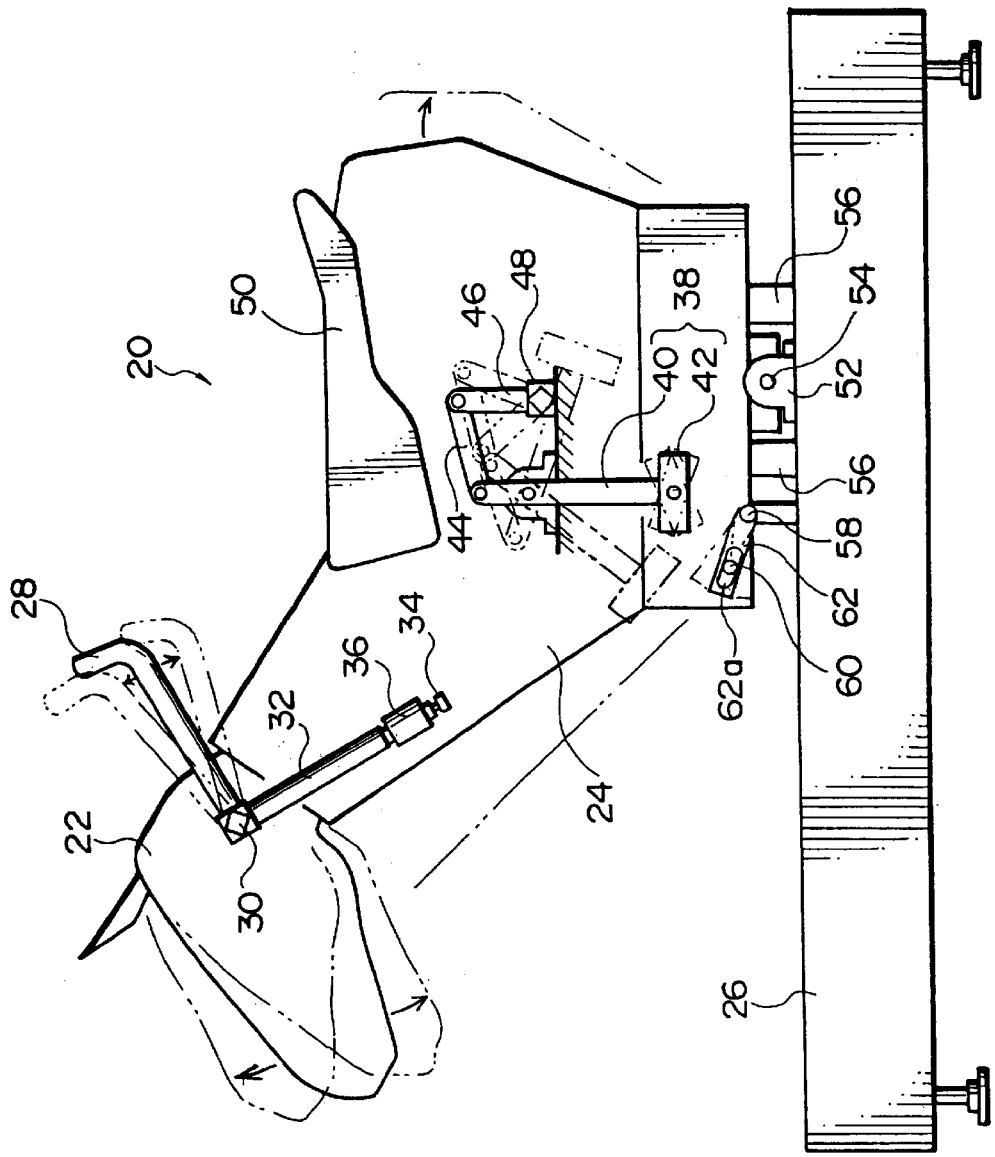
FIG. 1 illustrates a first embodiment of a mimetic animal device according to the present invention.
Figure 3:
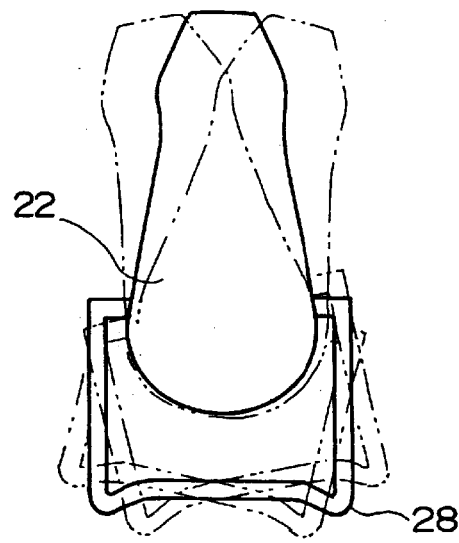
FIG. 3 is a plan view of the head in the first embodiment.

FIG. 1 is a schematic view of one of the mimetic animal devices. The mimetic animal device 20 comprises a main body including a head 22 and a body 24, and a base 26 supports and enables the body 24 to rock. FIG. 3 is a plan view of the head.

The head 22 is provided with a rein portion 28 which is formed by bending a rod-like metal member. The rein portion 28 is rotatable within the range of about 30 degrees through a mounting portion 30 provided in the head 22. The head 22 is fixedly connected to the rein portion 28 for enabling upward and downward movement together with the rein portion 28. The mounting portion 30 permits the rotational movement of the rein portion 28 while applying a reaction force thereto.

As shown in FIG. 3, the head 22 also rotats from side to side together with the rein portion 28. As shown in FIG. 1, the rein portion 28 rotates a rotary resistor 34 through a rotation shaft 32 which is fixed to the mounting portion 30. The rotary resistor 34 detects the orientation of the rein portion 28 and head 22. The rotation shaft 32 further receives a reaction force from a reaction force generator 36 to rotate in a reversed direction to the rotation shaft 32 rotates.

The body 24 includes steps 38, each of which includes a crank arm 40 and a pedal 42 mounted at right angle on one end of the crank arm 40 as in a bicycle pedal. The pedal 42 can be rotated within the limited range of about 20 degrees. The crank arm 40 can be rocked forward within a range of about 45 degrees and backward within a range of about 70 degrees from a home position which is a state to be lowered straightly. Within the interior of the body 24, one end of a link 44 is rotatably connected to the other end of the crank arm 40 and one end of a lever 46 is rotatably connected to the other end of the link 44. The other end of the lever 46 is mounted to a mounting portion 48. The mounting portion 48 rotatably supports the lever 46 while applying a reaction force thereto.

The crank arm 40, link 44 and lever 46 form a crank mechanism which converts the rocking movement of the crank arm 40 into the rocking movement of the lever 46. Since the mounting portion 48 applies the reaction force to the lever 46, the crank arm 40 will receive a force tending to return it in the opposite direction when the crank arm 40 is to be rocked.

The body 24 is provided a seat 50. However, a player plays a game in a half-rising posture rather than sitting on the seat 50. The body 24 is rockably mounted on the base 26. More particularly, a bearing 52 provided on the base 26 rotatably supports a rotating shaft 54 disposed on the lower end portion of the body 24 so that the body 24 can be rocked. Elastic members 56 made of rubber are interposed between the body 24 and the base 26. These elastic members 56 provide a reaction force against the rocking movement of the body 24.

The rocking movement of the body 24 can be detected by a rotary resistor 58 fixedly mounted on the base 26. More particularly, the rotary resistor 58 includes a rotating shaft (not shown) to which a rocking lever 62 is fixed. The body 24 has a pin 60 formed therein. The pin 60 is disposed in a groove 62a formed in the rocking lever 62. As the pin 60 is moved substantially up and down with the rocking movement of the body 24, the rocking lever 62 is also correspondingly rocked up and down. Such a rocking movement of the rocking lever 62 is detected by the rotary resistor 58.

In such an arrangement of the present embodiment, the operation thereof will now be described hereinafter. FIG. 4 illustrates a screen display of a game in the present embodiment while FIGS. 5A to 5C illustrate a manner in which the mimetic animal device is operated according to the present embodiment.

Figure 5A:
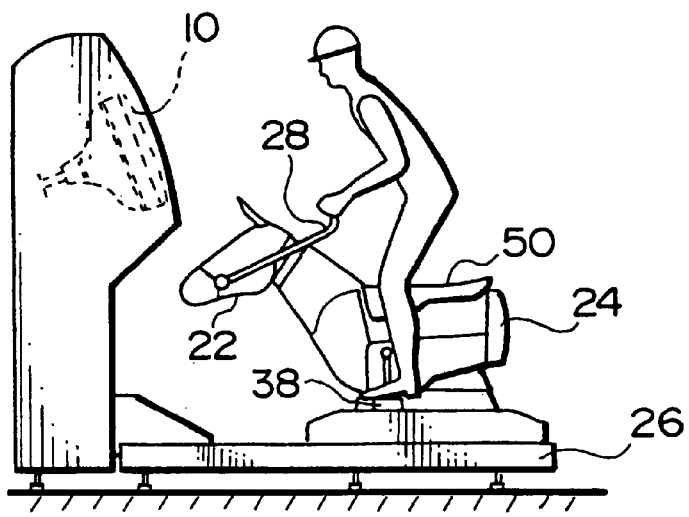
FIGS. 5A to 5C illustrate steps of operation of the mimetic animal device according to the first embodiment.
Figure 5B:
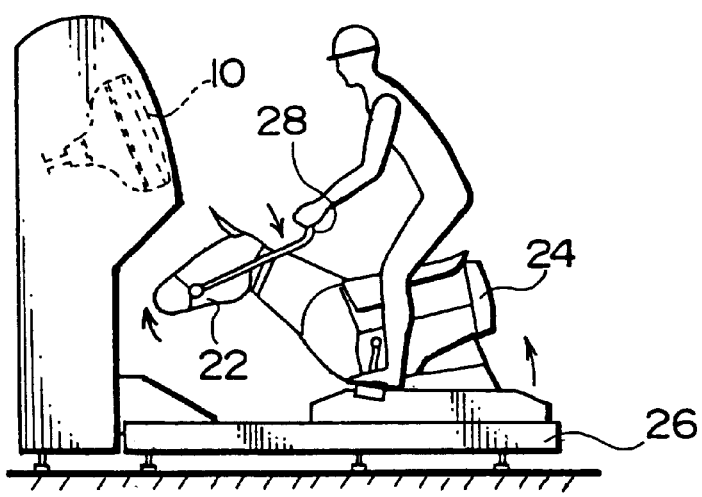
Figure 5C:
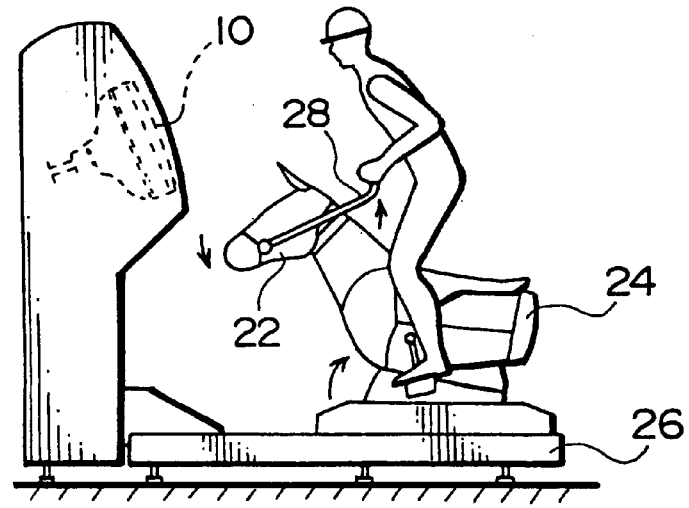

As shown in FIG. 5A, the player first gets on the pedals 42 in the steps 38 and grips the rein portion 28. At this time, the display 10 indicates a warning not to sit on the seat 50. When the game is initiated, the horse racing starts. As shown in FIG. 4, the display 10 shows the back of a virtual horse 300 that is handled by the player as viewed from a third person. The player pulls up and pushes down the rein portion 28 to rock the body 24. As a result, the virtual horse 300 will be handled in the virtual space.

More particularly, the forwarding direction of the horse is determined by pivoting the rein portion 28 from side to side to orient the horse head 22 to a certain direction, as shown in FIG. 3. This direction can be detected by the rotary resistor 34 shown in FIG. 1.

The speed of movement of the virtual horse is determined by the magnitude of rocking movement of the body 24. In other words, the speed is determined depending on an angle of rocking that is produced when the rein portion 28 is moved up and down to rock the body 24 forward and backward. Thus, as the angle of rocking increases, the speed of the virtual horse increases. More particularly, the body 24 is rocked by repeating such a motion that the rein portion 28 is pushed down to incline the body 24 forward and then pulled up to incline the body 24 backward as shown in FIG. 5B. At this time, the head 22 is inclined in the direction opposite to that of the body 24 inclining so that the head 22 is always oriented to a given direction. In other words, the virtual horse moves as if it is a real horse that pulls in its jaw as the neck is lifted and outthrusts its jaw as the neck is lowered. The angle of rocking movement is detected by the rotary resistor 58 shown in FIG. 1.

Further, when the body 24 is rocked, the steps 38 are also rocked depending on the posture of the player. However, the angle of rocking movement in the steps 38 does not affect the speed of the virtual horse.

In the present embodiment, the display 10 shows various information as shown in FIG. 4. For example, the central and top area of the display 10 shows a ranking 12 and a navigation section 14 on the right side of the ranking 12 for indicating a course and the current position. On the left side of the ranking 12, there is shown an intermediate result 16 which indicates the passage time and speed of the headmost horse as it passes through a given point. On the left side of the intermediate result 16, there is shown a position 18 in which the player's horse is among the other horses. The right and lower area of the display 10 shows a stamina meter 11 for indicating the degree of stamina exhaustion in the player's horse while the lower central area of the display shows an accelerator meter 13 for indicating the acceleration or deceleration of the player's horse. On the left side of the accelerator meter 13, there is shown a horse message 15 for informing the status of the player's horse. In FIG. 4, the horse message 15 shows such a state that the player's horse runs a downhill. On the left side of the horse message 15, there is shown an identification 17 that indicates the saddle-cloth and name of the player's horse. When the headmost horse passes through a given point near the goal, it is also shown.

According to the present embodiment, thus, the mimetic animal device 20 can be operated to control the virtual horse 300 shown in the display 10. The operation of this mimetic animal device 20 provides a feeling as if the player controls a real horse.

The present invention is not limited to the aforementioned embodiment, but may be performed in any of various modified forms. For example, the first embodiment discloses a devise having two displays 10 and two mimetic animal devices 20 allowing two players to play together, however, the number of the displays 10 and mimetic animal devices 20 may be increased and used in combination such that an increased number of players can play the game at the same time.

Second Embodiment

The second preferred embodiment of a riding game system according to the present invention will now be described in which parts corresponding to those of the first embodiment are designated by the same reference numerals and will not be further described.

Figure 6:
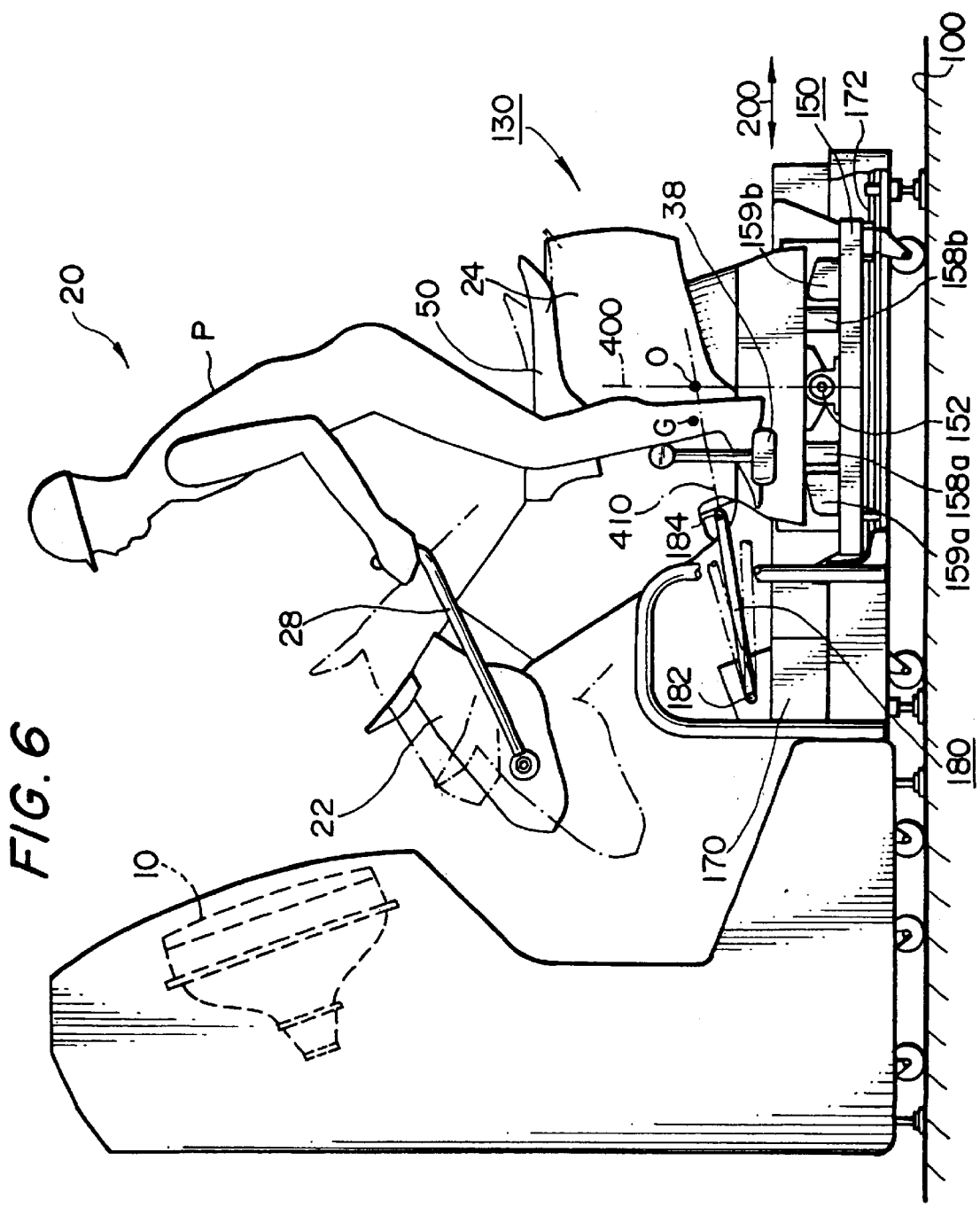
FIG. 6 illustrates a second embodiment of a mimetic animal device according to the present invention.

FIG. 6 illustrates a riding game system relating to the second embodiment which comprises a display 10 and a mimetic animal device 20. The display 10 shows a scene of horse racing as shown in FIG. 4 in accordance with information from the mimetic animal device 20. Correspondingly, the mimetic animal device 20 is structured like a racing horse.

The mimetic animal device 20 comprises a base 170 provided on a floor 100, a slide platform 150 disposed on the base 170 and is slidable forward and backward in the direction shown by an arrow in FIG. 6, a main body 130 mounted on the slide platform 150 supported by an rock shaft 152 for forward and backward rocking movement, and a link arm 180 fixedly mounted between the main body 130 and the base 170.

The main body 130 is in the form of a racing horse. A player P riding on the main body 130 rocks forward and backward to control a virtual horse 300 which is a player's character displayed on the display 10 within a virtual space.

First of all, the main body 130 will be described.

The main body or racing horse 130 comprises a head 22 and a body 24. The head 22 is provided with a rein portion 28 which is formed by bending a rod-like metal member. The rein portion 28 can be rotated within the range of about 30 degrees while a given reaction force is applied.

The head 22 can be rotated from side to side with the rein portion 28. At this time, the head 22 receives a reaction force in the reversed direction to that the head 22 is rotated from a reaction force generator (not shown). The angle that the head 22 rotates from side to side is detected by a rotational angle detecting means (not shown) so that the virtual horse 300 moves within the virtual space to the direction in which the head 22 is facing.

The body 24 includes steps 38 formed thereon. Each of the steps 38 includes a pedal mounted at right angle on a crank arm at one end, as in the actual bicycle pedal.

The body 24 is also provided a seat 50. However, the player plays the game in a half-rising posture rather than sitting on the seat 50 by rocking the body 130 forward and backward.

Figure 7:
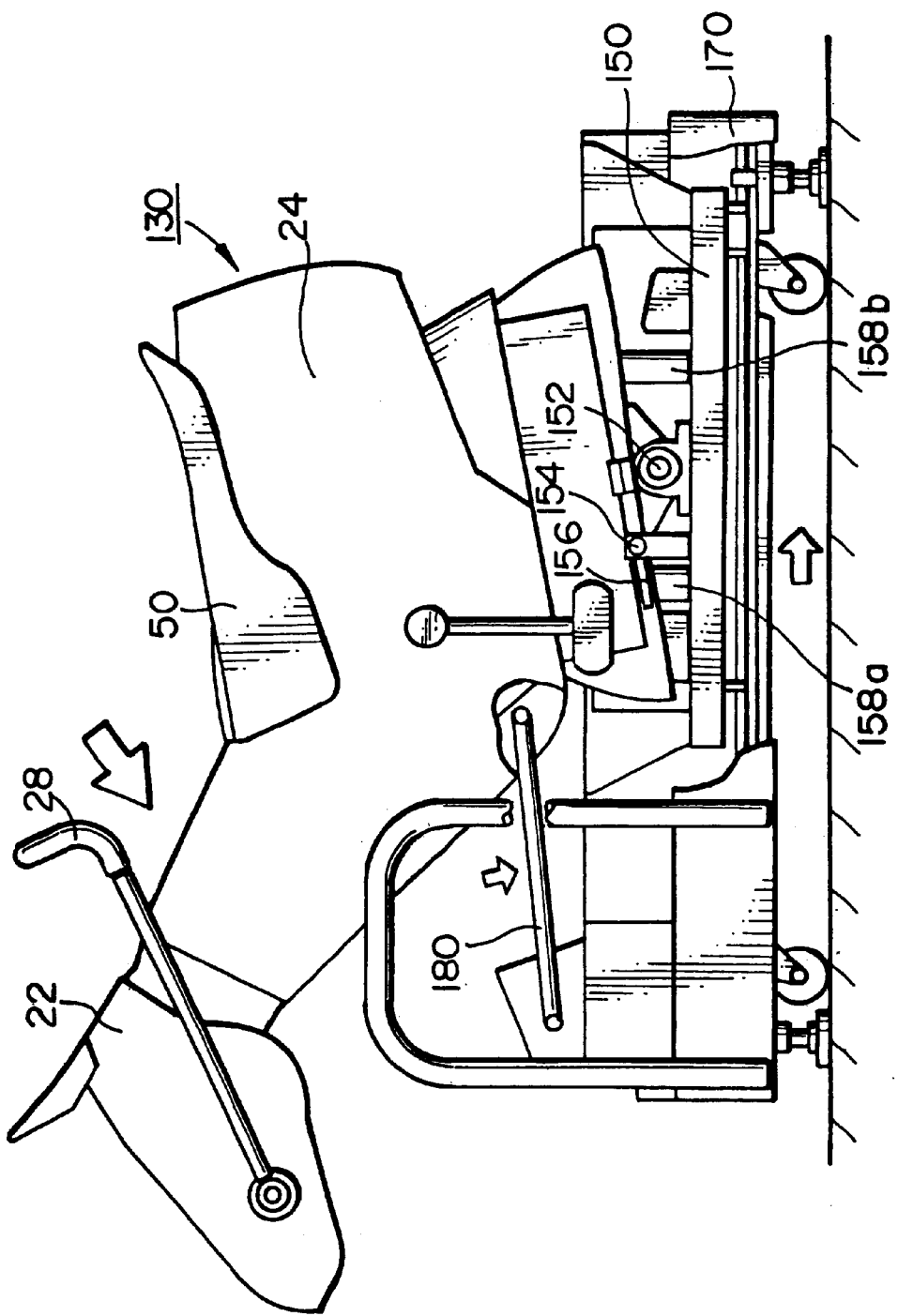
FIG. 7 illustrates the operation of the mimetic animal device shown in FIG. 6 when it is forwardly inclined.
Figure 8:
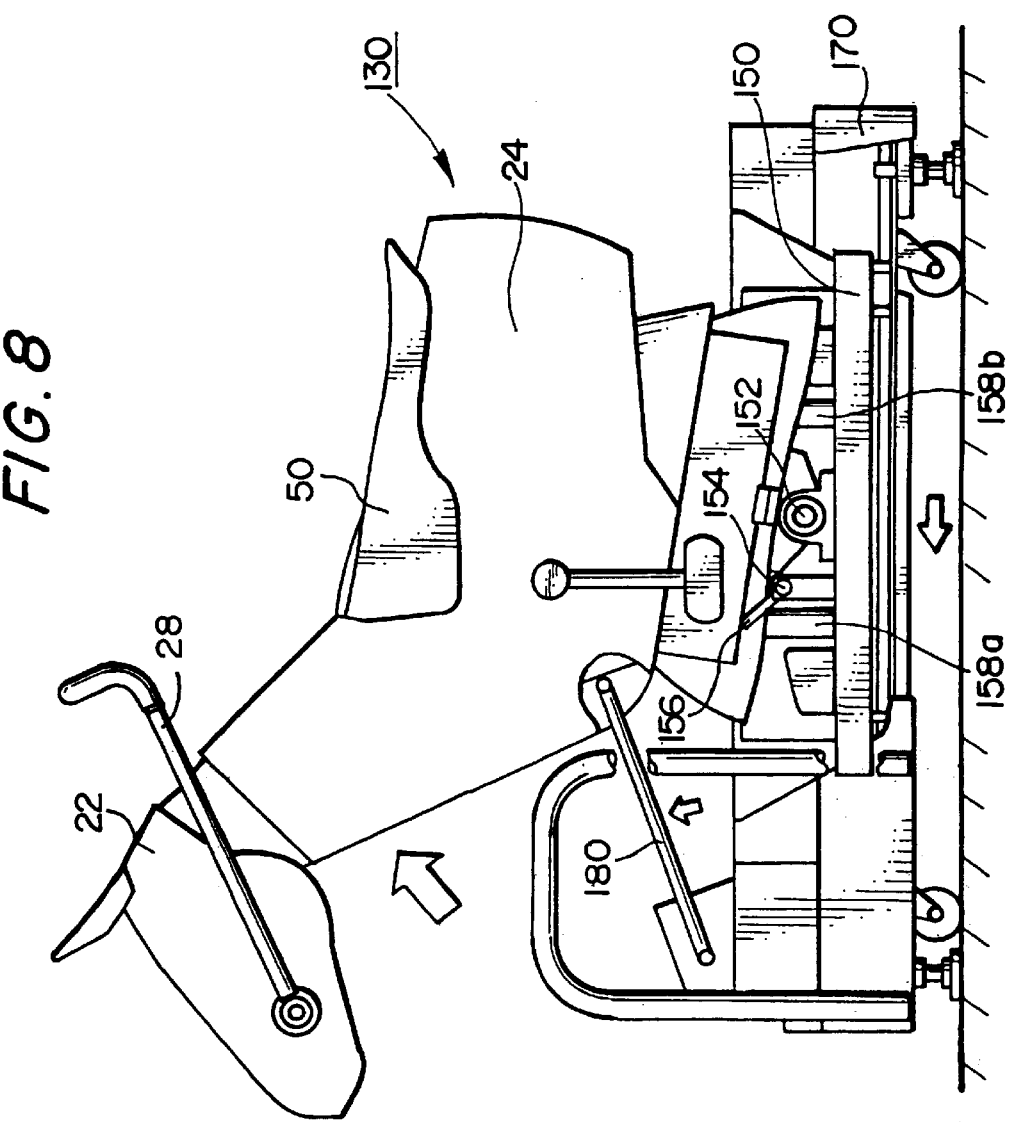
FIG. 8 illustrates the operation of the mimetic animal device shown in FIG. 6 when it is backwardly inclined.

The angle of rocking movement of the body 24 can be detected by a rotary resistor 154 fixedly mounted on the slide platform 150, as shown in FIGS. 7 and 8. More particularly, a rocking lever 156 is fixedly connected to the rotating shaft (not shown) of the rotary resistor 154 while a pin (not shown) is provided on the body 24. The pin is disposed within a groove (not shown) which is formed along the longitudal of the rocking lever 156. Thus, the pin substantially moves up and down as the body 24 is rocked back and forth. Correspondingly, the rocking lever 156 is also rocked up and down. The angle of rocking movement in the rocking lever 156 is detected by the rotary resistor 154.

The slide platform 150, base 170 and link arm 180 will be described.

First and second elastic members 158a and 158b are interposed between the slide platform 150 and the main body 130. When the body 24 is rocked, the elastic members will apply a reaction force to the body 24 to return it to its neutral position shown in FIG. 6. In the present embodiment, the elastic members 158a and 158b are formed of an elastic rubber material so that the reaction force is effectively produced, and disposed on the opposite sides each other to a rock shaft 152.

The slide platform 150 is provided cushion members 159a and 159b which are disposed between the slide platform 150 and the main body 130 to absorb an upward and downward impact transmitted from the main body 130 to the slide platform 150. These cushion members 159a and 159b are disposed on the opposite sides of the rock shaft 152.

In such an arrangement, the up-and-down oscillation can effectively be absorbed corresponding to the rocking movement of the main body in the first direction. Further, a biasing force can effectively be applied to the main body to return it into its neutral position.

As mentioned above, the slide platform 150 is mounted on the base 170 and enabled to slide in a direction as shown by arrow 200 in FIG. 6 (i.e., forward and backward). In the present embodiment, the slide platform 150 is slidably mounted on slide rails 172 which are provided forward and backward on the base 170.

The range of forward and backward slide movement of the slide platform 150 is limited by a link arm 180 which is mounted between the base 170 and the main body 130.

More particularly, the link arm 180 is rotatably mounted on the base 170 through a first mounting portion 182 and on the main body 130 through a second mounting portion 184.

As shown in FIGS. 7 and 8, therefore, the slide platform 150 slides forward or backward depending on the rotating direction of the main body 130. For example, as shown in FIG. 7, the main body 130 can be inclined forward to produce the backward movement of the slide platform 150. As shown in FIG. 8, the main body 130 can be inclined backward to produce the forward movement of the slide platform 150. Thus, the slide platform 150 can be slidably moved forward and backward as shown by arrow 200 in FIG. 6 when the main body 130 is rocked forward and backward. The forward and backward oscillation of the main body 130 produced by the rocking movement can be absorbed by the slide platform 150 and will not be propagated directly to the base 170. Therefore even if the player P violently moves the main body 130 forward and backward, such a situation that the position of the base 170 is slipped backward or forward relative to the proper position under the rocking movement of the main body 130 can be prevented.

In the present embodiment, when the main body 130 is in its neutral position as shown in FIG. 6, a point O at which the perpendicular 400 including the rock shaft 152 intersects an extension 410 of the link arm 180 becomes a virtual rocking center in the main body 130. It is therefore preferable that the link arm 180 is mounted to the main body so that the virtual rocking center O is substantially the same height as the center of gravity G in the main body 130.

In such an arrangement, the rotational inertia between the virtual center O and the center of gravity G acts upward and downward in FIG. 6. The backward and forward component in the rotational inertia is substantially ignorable. Even though the player P violently moves the main body 130 forward and backward, therefore, such a forward and backward rocking movement can be converted into a oscillation in the upward and downward direction which is transmitted to the slide platform 150. Thus, transmission of the back-and-forth oscillation to the base 170 can more effectively be reduced. In addition, the upward and downward oscillation component is absorbed by the cushion members 159a and 159b, so that the jolt due to the upward and downward oscillation component can also be effectively reduced.

In consideration of the fact that it is relatively difficult to specify the center of gravity G in the main body from the design drawings, it is preferred that the second mounting portion 184 of the link arm 180 is positioned so as to be adjustable in the upward and downward direction in FIG. 6. In such a manner, when the link arm 180 is mounted on the main body 130, the position of the second mounting portion 184 may be finely adjusted so that the transmission of the forward and backward rocking movement of the main body 130 to the base 170 becomes minimum. Accordingly, the virtual center O can be set substantially at the same height as in the center of gravity G. This can effectively reduce the transmission of the oscillation from the main body 130 to the base 170.

The operation of the mimetic animal device according to the present embodiment will be described below.

As shown in FIG. 6, the player P first gets on the pedals of the steps 38 with his/her foot and grips the rein portion 28. At this time, the display 10 shows a warning not to sit on the seat 50.

As the game is initiated, the horse racing starts. As shown in FIG. 4, the display 10 shows the back of a virtual horse 300 that is handled by the player as viewed from a third person. The player P pulls up and pushes down the rein portion 28 to rock the body 24 forward and backward. As a result, the virtual horse 300 will be handled in the virtual space.

At this time, the speed of the virtual horse depends on the rocking angle of the body 24. In other words, the speed is determined depending on an angle of rocking that is produced when the rein portion 28 is moved up and down to rock the body 24 forward and backward. Thus, as the angle of rocking increases, the speed of the virtual horse increases. In the present embodiment, thus, the mimetic animal device 20 can be operated with rocking movement by the player to handle the virtual horse 300 on the display 10. Therefore, the player can enjoy the game with a feeling as if the player rides on a real horse by operating the mimetic animal device 20.

The player P often rocks the body 24 largely forwards and backward to run the virtual horse 300 at higher speed. The forward and backward rocking movement of the body 24 is absorbed by the backward and forward sliding movement of the slide platform 150 to prevent it from being transmitted to the base 170. Accordingly, the base 170 can stabilized on the floor 100 without being undesirably affected by the rocking movement of the body 24.

The present invention is not limited to the aforementioned embodiment, but may be embodied in any of various modified forms.

For example, the present invention may be applied to any other game in which a character like any animal or virtual animal other than the horse in the mimetic animal device 20 is controlled to play the game. Furthermore, the present invention may also be applied to any ride or vehicle other than the animals.

Although the embodiments of the present invention have been described as to the forward and backward rocking movement, it may be similarly applied to an apparatus which takes a from-side-to-side rocking movement mechanism or a rocking movement mechanism in a direction intersecting the backward-and-forward and from-side-to-side rocking directions, if necessary.

What is claimed is:

1. A riding game system comprising:
    a slide platform mounted on a base slidably in a first direction;
    a main body supported on said slide platform, being capable of rocking movement in said first direction, said main body being rocked by a player;
    biasing means for returning said main body to neutral position thereof; and
    link means disposed between said main body and said base; and
    wherein said main body is rocked in the first direction while sliding said slide platform in the first direction.

2. The riding game system according to claim 1 wherein said link means controls the sliding of said slide platform so that the slide platform moves backward when said main body inclines forward in the first direction, and the slide platform moves forward when said main body inclines backward.

3. The riding game system according to claim 1 wherein said main body is formed as a game ride body which is rocked and controlled by a player riding thereon.

4. The riding game system according to claim 1 wherein said link means is mounted in the direction toward a virtual center positioned on a perpendicular including a rocking center of said main body when said main body is in said neutral position.

5. The riding game system according to claim 4 wherein said virtual center is positioned so that it is on perpendicular including the rocking center of said main body and has a height substantially equal to the center of gravity of said main body when said main body is in said neutral position.

6. The riding game system according to claim 1 wherein said biasing means is disposed between said slide platform and said main body.

7. The riding game system according to claim 1 wherein said first direction is set in the backward and forward direction relative to the player riding on said main body.

8. The riding game system, according to claim 7:
wherein said main body is in the form of an animal which is capable of backward and forward rocking movement by a player riding thereon; and
wherein said riding game system comprises:
means for detecting a rocking angle of said main body; and
means for controlling a player character in the form of said animal within the virtual space according to the detected rocking angle.

9. The riding game system according to claim 1 wherein said link means is mounted on said main body being adjustable in the direction of height of said main body.

* * * * *